United States Patent [19]

Tobias

[11] Patent Number: 5,594,202
[45] Date of Patent: Jan. 14, 1997

[54] SPLIT SLEEVE SYSTEM

[76] Inventor: Michael A. Tobias, 421 Second Ave., Saraland, Ala. 36571

[21] Appl. No.: 354,251

[22] Filed: Apr. 6, 1995

[51] Int. Cl.$^6$ ..................................................... H02G 3/10
[52] U.S. Cl. ........................... 174/48; 174/65 R; 248/56
[58] Field of Search .................................. 174/48, 65 R, 174/65 G, 151, 135; 220/3.2; 248/56

[56] References Cited

U.S. PATENT DOCUMENTS

| | | | |
|---|---|---|---|
| 2,431,154 | 11/1947 | Wikstrom | 174/65 SS |
| 2,945,085 | 7/1960 | Billips | 248/56 |
| 3,240,502 | 3/1966 | Snyder | 248/56 |
| 4,804,197 | 2/1989 | Drbal | 174/65 G X |
| 4,919,372 | 4/1990 | Twist et al. | 248/56 |
| 5,079,389 | 1/1992 | Nelson | 174/48 |
| 5,406,032 | 4/1995 | Clayton et al. | 174/151 |

Primary Examiner—Laura Thomas
Assistant Examiner—Paramita Ghosh
Attorney, Agent, or Firm—Nies, Kurz, Bergert & Tamburro

[57] ABSTRACT

A sleeve system and method for using same provides an encasement for wires and cables passing through a wall or floor. The sleeve system is particularly useful in allowing the walls within a building to meet fire code requirements. The sleeve system can be used regardless of whether the wiring or cabling has already been installed through the wall or floor. The invention includes a pair of mating sleeve units individually inserted around the cables through the wall or floor and appropriate securing devices for tightly retaining the sleeve units in place. In one embodiment, the securing devices include at least one slotted flange and a slotted coupler on each side of the wall. The sleeve construction also allows easy installation of additional cables through the sleeve.

10 Claims, 3 Drawing Sheets

SPLIT SLEEVE SYSTEM

BACKGROUND AND SUMMARY OF THE INVENTION

This invention is related to cabling systems, and more particularly to a sleeve system for cables and wires extending through a wall or floor wherein the sleeve system can bring the wiring of the structure within the applicable fire code without necessitating removal or splicing of the cables or wires.

Computer and data communication systems are a vital part of business today. A system shutdown, whether planned or unplanned, can result in complete suspension of business operations. As a result, many companies go to great extremes to try to prevent system down time by, for example, purchasing "hot swap" file servers, stand-by power supplies, and built in redundancy for their systems.

Unfortunately, none of these precautions will prevent a shutdown which is required in order to repair wall or floor penetrations that violate the applicable building codes. As building codes have become increasingly more stringent, building inspections are frequently discovering cable lines installed through firewalls wherein the installer breached the wall without restoring it back to code. The national, state, and most local codes require all cables to be installed through a firewall in a metallic conduit.

Nevertheless, in the construction industry today, the standard practice for re-sealing an existing firewall penetration is merely to apply enough "dry wall mud" to seal the penetration point. While aesthetically satisfactory, this method gives no assurance that the seal meets the code requirements. Furthermore, this type of seal is easily broken by the least amount of stress on the cables and also requires breaking and resealing the wall again in the event additional cables need to be installed.

Re-wiring these firewalls to meet fire codes ordinarily necessitates removal or splicing of each existing cable so as to allow an appropriate conduit to be inserted into the firewall. This forces businesses to shut down their computer and data communication systems while the repair occurs.

The present invention provides a simple device and method for using the device which allows firewalls which are currently in violation of national, state, or local code due to substandard wall penetration to be brought into conformance with the code without having to remove or splice any cable or wiring.

It is thus one object of the present invention to provide a device which can bring improper, damaged, or outdated firewall penetrations up to current National Fire and Electric Code standards.

It is a further object of the present invention to provide a device which can bring substandard wiring or cabling through a wall or floor up to code requirements without requiring removal or splicing of the wiring or cabling.

It is another object of the invention to provide a device which can bring substandard wiring or cabling up to code requirements without necessitating system shutdown.

It is yet another object of the present invention to provide a device for protecting cables or wires through a wall or floor which allows simple installation of additional wiring through the wall or floor.

It is another object of the present invention to provide a method for bringing substandard wiring or cabling through a wall or floor up to code requirements without requiring removal or splicing of the wiring or cabling.

By the present invention, there is provided a split sleeve system for protecting cables or wires in a firewall environment. In one embodiment, the system includes a pair of sleeve units which are identical halves of a cylindrical shell threaded over its length and split along its longitudinal axis. The sleeve units contain the cables or wires and are secured within the wall by the use of at least one slotted flange and a slotted coupler on each side of the wall. The slots in the flanges and couplers enable these components to be fitted around existing wiring or cabling.

DESCRIPTION OF THE PREFERRED EMBODIMENTS

Figure 1:
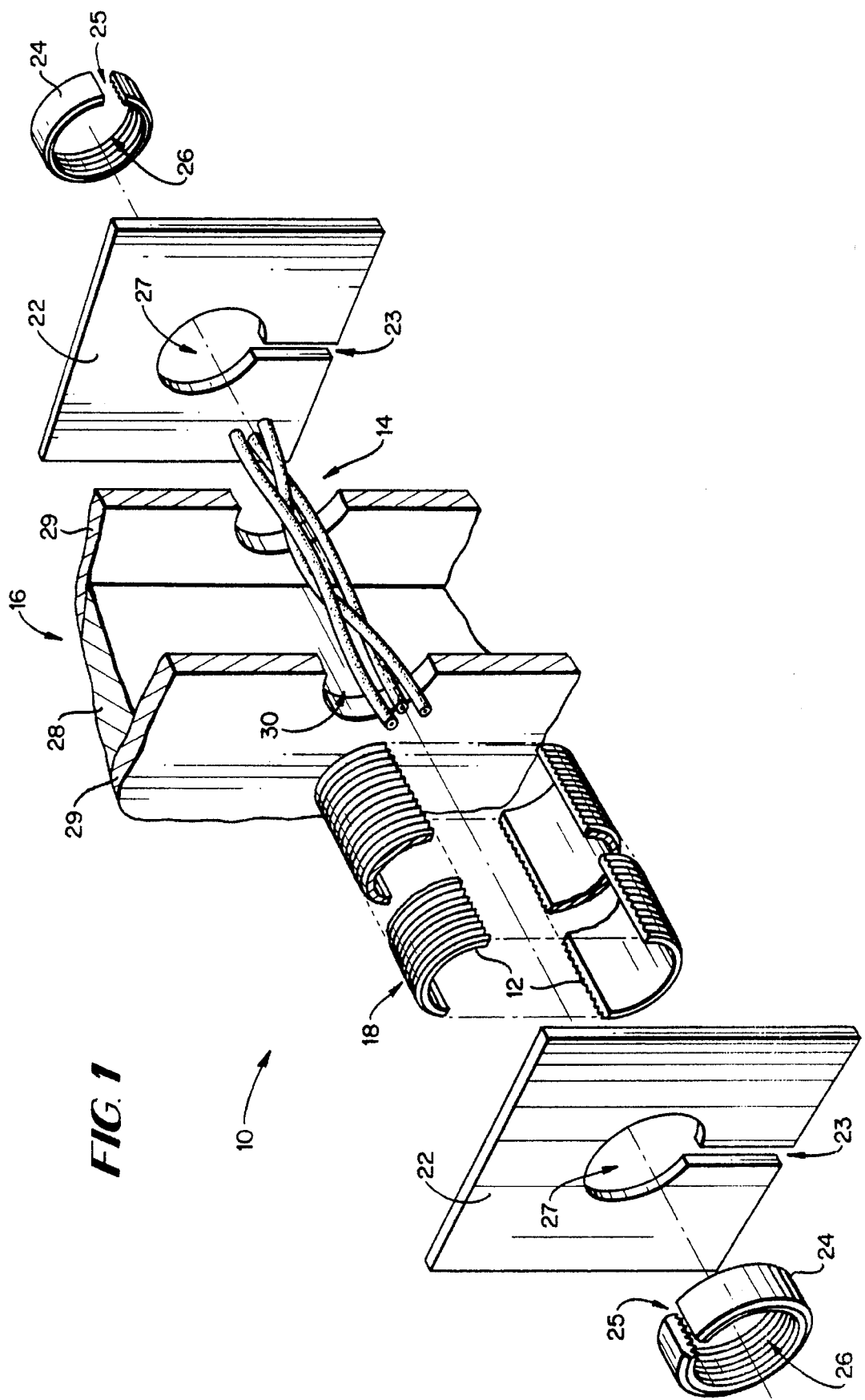
FIG. 1 is an exploded perspective view of the device of the present invention shown before mounting through a firewall.
Figure 2:
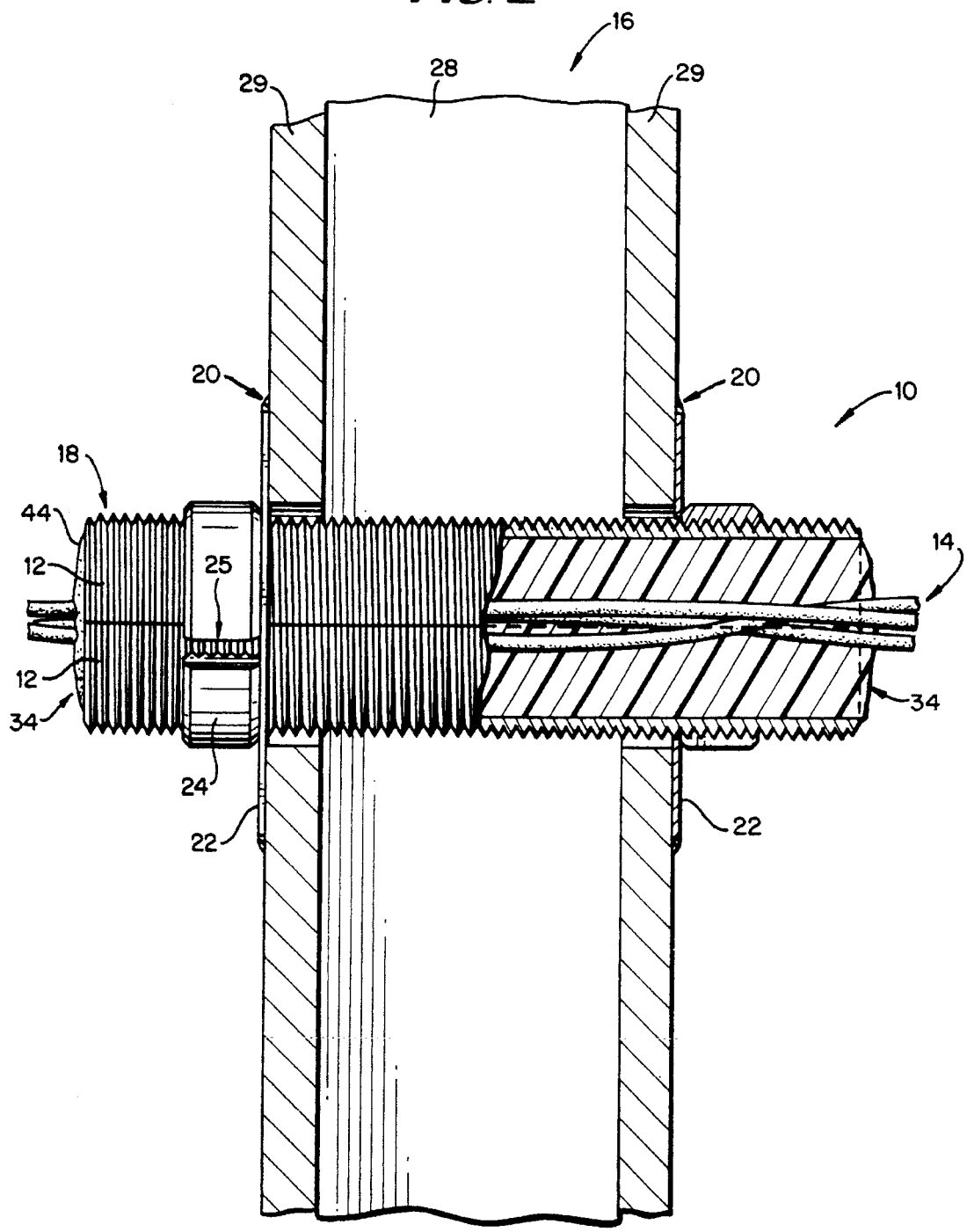
FIG. 2 is a side elevation view in partial cross-section of the device of the present invention shown installed in a firewall.
Figure 3:
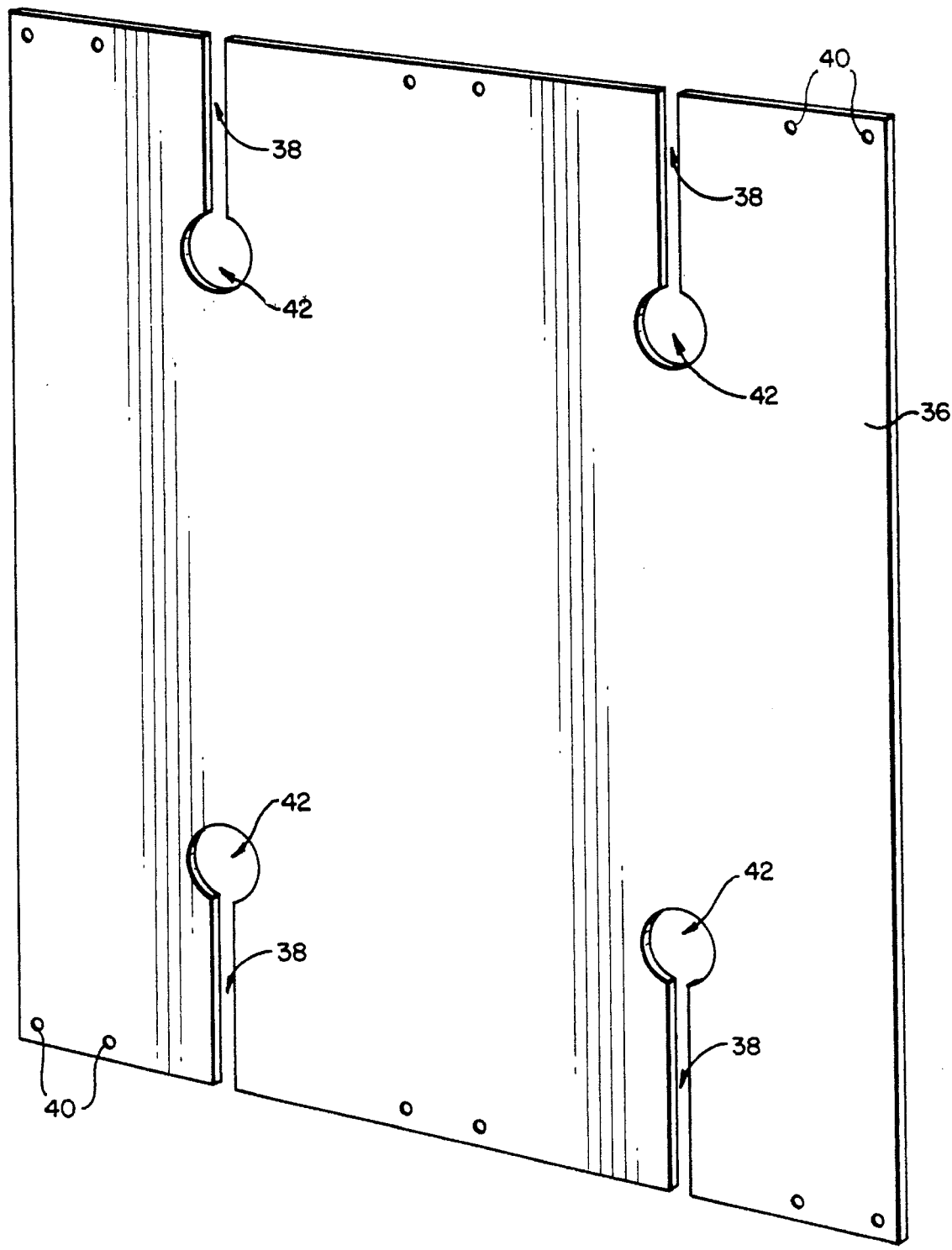
FIG. 3 is a perspective view of a split sleeve bulkhead in accordance with the present invention.

As shown in FIGS. 1 through 3, there is provided a split sleeve system 10 for use such as in bringing substandard building structure cable penetrations up to code requirements without requiring removal or splicing of the cable. While the drawing figures depict the use of the sleeve system 10 horizontally through a firewall 16, the sleeve system 10 may also be employed in a vertical arrangement such as in a ceiling or floor penetration. The system 10 has two mating sleeve units 12 which act as the outer casing for the existing cables 14 which run through the firewall 16. The firewall 16 typically includes wood or metal frame studs 28 covered on both sides with dry wall material in the form of a sheet 29 of fire rated sheet rock. The outer end surfaces 18 of each sleeve unit 12 may be threaded as shown in FIGS. 1 and 2. In a preferred embodiment of the invention, the sleeve units 12 are identical halves of a cylindrical shell threaded over its entire length and split along its longitudinal axis. The sleeve units 12 may have a length such as about ten inches.

A pair of slotted flanges 22, each having a central opening or aperture 27, are positioned around the outer surface 18 of each sleeve unit 12 and are initially mounted to the firewall 16 using caulking material 20. A pair of slotted couplers 24 are also provided, each with a threaded inner surface 26 as shown in FIG. 1 so as to allow threaded engagement of each coupler 24 with a respective end of the mated sleeve units 12. The slots 23, 25 should be wide enough to accommodate any desired size of cable or wiring. In one embodiment of the invention, the slots 23 on the flanges 22 and the slots 25 on the couplers 24 are approximately ⅝ inches wide. When installed on the sleeve units 12, the couplers 24 should be threaded tightly against the flanges 22 so as to maintain the sleeve units 12 in close fitting engagement within the firewall 16, as shown in FIG. 2.

FIG. 3 shows an alternative to using the individual flanges 22 of FIGS. 1 and 2. In FIG. 3, a split sleeve bulkhead 36 is provided with multiple slots 38 for use when multiple types of cables are penetrating a firewall 16, for example. With this construction, a pair of identical bulkheads 36 are mounted on opposite sides of the firewall 16 such as by the insertion of nails or the like through the mounting holes 40.

Cables 14 may then be separated and managed in individual slotted holes 42 whereupon pairs of sleeve units 12 and couplers 24 can finish the sealing of the firewall 16.

In operation, with reference to FIGS. 1 and 2, the size of the hole 30 needed in the firewall 16 is first determined. By the use of a keyhole saw or similar device, the hole 30 may be cut around an existing substandard cable penetration opening or may be cut freshly into the surface of the firewall 16. Ideally, the size of the hole 30 is larger than required for the immediate cabling needs to allow room for further growth.

After the hole 30 has been cut, the first of the sleeve units 12 is inserted through the hole 30 into place around the existing cabling wires 14, if any. The second sleeve unit 12 is then inserted through the hole 30 around the cables 14 and is aligned with the first sleeve unit 12 to form a cylinder. The outer surface threads 18 of the sleeve units 12 thus become aligned.

Next, the cables 14 on each side of the firewall 16 are inserted through the slots 23 in the individual slotted flanges 22 and the flanges 22 are firmly mounted flush with the firewall 16 using caulking material. The cables 14 are then threaded through the slots 25 in each coupler 24, with each coupler 24 then engaging the sleeve units 12 and being tightened until the couplers 24 abut the individual flanges 22, thus tightening the assembly 10 against the firewall 16. The ends 34 of the sleeve system 10 may then be sealed with fire dam caulking 44 or the like.

In one embodiment of the invention, a pair of slotted flanges 22 are employed at each end of the system 10. In this arrangement, a first flange 22 is installed as previously discussed and a second flange 22 is then installed immediately adjacent the first flange 22 at each end, with the two adjacent flanges 22 having their respective slots 23 positioned at 180 degrees relative to each other. In this way, additional protection against fire penetration is provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A split sleeve system for encasing wiring or cabling passing through a wall or floor, comprising:

a pair of mating sleeve units having at least one outer end portion and having a hollow interior when mated; and securing means for securing said sleeve units within said wall or floor, whereby said wiring or cabling can pass through said securing means and said hollow interior of said pair of mating sleeve units, said securing means including at least one hollow slotted flange capable of fitting over said pair of mating sleeve units and at least one slotted coupler capable of threadedly engaging said at least one outer end portion of said pair of mating sleeve units.

2. The split sleeve of claim 1 wherein said pair of mating sleeves are formed as identical halves of a cylindrical shell threaded at said at least one outer end portion and with said halves formed by splitting said shell along a longitudinal axis of said shell.

3. The split sleeve system of claim 2 wherein said mating sleeve units are made of black iron.

4. The split sleeve system of claim 1 wherein said securing means comprises a pair of said hollow slotted flanges capable of fitting over said pair of mating sleeve units such that the slots of said flanges are unaligned including at least one slotted coupler capable of threadedly.

5. The split sleeve system of claim 4 wherein the slots of said pair of slotted flanges are positioned at 180 degrees relative to each other.

6. A method for encasing wiring or cabling passing through a wall or floor, comprising the steps of:

(a) providing a hole through said wall or floor;

(b) inserting a pair of mating sleeve units through said hole, said sleeve units having at least one outer end portion and having a hollow interior when mated; and (c) providing securing means for securing said sleeve units within said wall or floor, said securing means including at least one hollow slotted flange capable of fitting over said pair of mating sleeve units and at least one slotted coupler capable of threadedly engaging said at least one outer end portion of said pair of mating sleeve units.

7. The method of claim 6 wherein said pair of mating sleeve units are formed as identical halves of a cylindrical shell threaded at said at least one outer end portion and split along a longitudinal axis of said shell.

8. The method of claim 7 wherein said securing means includes a pair of said hollow slotted flanges capable of fitting over said pair of mating sleeve units such that the slots of said flanges are unaligned.

9. The method of claim 8 wherein the slots of said pair of slotted flanges are positioned at 180 degrees relative to each other.

10. A split sleeve system for encasing wiring or cabling passing through a wall or floor, comprising:

a pair of mating sleeve units having at least one outer end portion and having a hollow interior when mated; and securing means for securing said sleeve units within said wall or floor, whereby said wiring or cabling can pass through said securing means and said hollow interior of said pair of mating sleeve units, said securing means including a split sleeve bulkhead having at least one slot for receiving said wiring or cabling, at least one opening in said bulkhead for receiving at least one of said pair of mating sleeve units and at least one slotted coupler capable of threadedly engaging said at least one outer end portion of said pair of mating sleeve units.

* * * * *

UNITED STATES PATENT AND TRADEMARK OFFICE
CERTIFICATE OF CORRECTION

PATENT NO.   : 5,594,202
DATED        : January 14, 1997
INVENTOR(S)  : Michael A. Tobias It is certified that error appears in the above-indentified patent and that said Letters Patent is hereby corrected as shown below:

Column 4, line 15, cancel beginning with "including at least" to and including "threadedly".

Signed and Sealed this

Seventeenth Day of March, 1998

Attest:

BRUCE LEHMAN

Attesting Officer

Commissioner of Patents and Trademarks